(12) United States Patent
Vesborg et al.

(10) Patent No.: US 8,241,551 B2
(45) Date of Patent: Aug. 14, 2012

(54) METHOD OF STRETCH-BLOW-MOULDING A BEVERAGE CONTAINER

(75) Inventors: Steen Vesborg, Gentofte (DK); Jan Norager Rasmussen, Olstykke (DK)

(73) Assignee: Carlsberg Breweries A/S, Copenhagen V (DE)

( * ) Notice: Subject to any disclaimer, the term of this patent is extended or adjusted under 35 U.S.C. 154(b) by 0 days.

(21) Appl. No.: 12/812,411

(22) PCT Filed: Jan. 6, 2009

(86) PCT No.: PCT/DK2009/000001
§ 371 (c)(1),
(2), (4) Date: Sep. 15, 2010

(87) PCT Pub. No.: WO2009/086830
PCT Pub. Date: Jul. 16, 2009

(65) Prior Publication Data
US 2011/0012295 A1 Jan. 20, 2011

(30) Foreign Application Priority Data
Jan. 9, 2008 (EP) ..................................... 08388002

(51) Int. Cl.
*B29C 49/08* (2006.01)
*H05B 6/00* (2006.01)
(52) U.S. Cl. ........ 264/454; 264/405; 264/513; 264/516; 264/532; 264/537
(58) Field of Classification Search .......................... None
See application file for complete search history.

(56) References Cited

U.S. PATENT DOCUMENTS

| | | | | |
|---|---|---|---|---|
| 5,240,144 A | * | 8/1993 | Feldman | 222/82 |
| 5,957,328 A | * | 9/1999 | Osgar | 222/1 |
| 6,428,735 B1 | * | 8/2002 | Deemer et al. | 264/454 |
| 2006/0141189 A1 | | 6/2006 | Akiyama et al. | |
| 2006/0147664 A1 | * | 7/2006 | Richards et al. | 428/35.7 |
| 2006/0255049 A1 | | 11/2006 | McCarthy et al. | |

FOREIGN PATENT DOCUMENTS

| | | |
|---|---|---|
| DE | 29724025 | 12/1999 |
| EP | 1043235 | 10/2000 |
| EP | 1798017 | 6/2007 |
| JP | 2007223628 | 9/2007 |
| WO | WO2007/019853 | 2/2007 |

OTHER PUBLICATIONS

International Search Report on related PCT application (PCT/DK2009/000001); International Searching Authority (EPO) dated Jul. 30, 2009.

* cited by examiner

*Primary Examiner* — Monica A Huson
(74) *Attorney, Agent, or Firm* — Klein, O'Neill & Singh, LLP

(57) ABSTRACT

A method of stretch-blow-molding a beverage container for containing a carbonized beverage which method comprises providing a preform (11) having a neck part and a body part. The preform includes an inner layer (24) of a first polymeric composition, an outer layer (12) of a second polymeric composition, and an intermediate layer (22) of a third polymeric composition. The third polymeric composition has adhesive surface properties relative to the first and second polymeric compositions, and the adhesive surface properties are permanently degraded by exposure to irradiation of a certain wavelength or certain wavelengths and intensity. The method further comprises mounting the preform onto a stretch-blow-molding device and blow molding the preform into the beverage container by irradiating the body part with radiation at least including the certain wavelength or certain wavelengths and intensity while protecting the neck part from any substantial radiation.

16 Claims, 6 Drawing Sheets fig. 2a fig. 2b fig. 4 fig. 5 fig. 6

|  |  | PP | PET |
|---|---|---|---|
| Glass Temperature | °C | -10 | 75 |
| Melt Temperature | °C | 140-170 | 250-265 |
| Thermal Conductivity | W/m. °C | 0,15 | 0,29 |
| Specific Heat | Cal/g. °C | 0,53 | 0,32 |
| Biaxial Orientation | °C | 130-150 | 90-115 | fig. 7

METHOD OF STRETCH-BLOW-MOULDING A BEVERAGE CONTAINER

CROSS-REFERENCE TO RELATED APPLICATION

This application is a national phase filing, under 35 U.S.C. §371(c), of International Application No. PCT/DK2009/000001, filed Jan. 6, 2009, the disclosure of which is incorporated herein by reference in its entirety.

FEDERALLY SPONSORED RESEARCH OR DEVELOPMENT

Not Applicable

BACKGROUND

The present invention relates to a method of stretch-blow-moulding a beverage container and a method to dispense a beverage.

Stretch-blow-moulding of polyesters like polyethylene terephthalate from an injection-moulded preform has been known on a commercial scale since Nathaniel Wyeth at DuPont demonstrated the reheat process. AOKI and Nissei developed the injection blow-moulding technology into a viable alternative to the reheat and blow process. Such blow-moulded hollow articles are to a large extent used for the distribution of beverages, and PET bottles or containers have become generic items.

There are several problems associated with the technology:
Lack of barrier for water, $CO_2$, and $O_2$.
Lack of barrier for certain wavelengths of light, which can rapidly deteriorate the taste of the beverage.
Generation of the off taste ingredient acetic aldehyde, by deterioration of the polymer itself.
Cost of the polymer which has high value in other fields, such as electrical dielectric in capacitors and as the most important fabric fibre material for clothing and carpets.

Some of the above problems may be solved by co-injection of the preforms in up to 7 layers. These are, after reheating, blown simultaneously in one step. Normally, it is of the highest importance to avoid delamination during this production process. Delamination not only reduces the strength of the beverage container, it also reduces the aesthetics of the beverage container.

The material used for the preform layers should preferably be any thermoplastics such as PET or polypropylene (PP). The use of metal or glass should be avoided due to increased recycling costs.

The blow-moulding process normally includes heating of the preform using an IR (infrared) lamp to make the preform deformable. The preform layers may have different absorption wavelengths. Therefore possibly a plurality of IR lamps, each having a separate peak intensity wavelength or wavelengths, may be necessary for heating the preform and making it deformable.

Alternatively, two layers or more layers may have the same absorption wavelengths and may thus be heated using the same IR lamp.

The layers may be dyed or otherwise treated for maximum absorption of a certain wavelength or wavelengths. Such treatment may comprise adding an absorption constituent such as aluminium dioxide or carbon black.

To avoid delamination an adhesive film may be applied between the different layers in the preform. The adhesive film is intended to increase the adhesion between the layer materials by the use of Van der Waal type physical adhesion.

To avoid influencing the material properties of the layers or influencing the properties of the beverage contained in the beverage container a chemical bond between the layers should be avoided.

The adhesive film should be flexible in order to be able to cover the complete interface between the thermoplastic layers as the walls of the preform are considerably stretched during the blow-moulding process. A single void in the film may lead to reduced adhesion, which may lead to delamination of the beverage container. Adhesive film material which may be used for the above purpose includes, e.g., nylon.

In some cases it may be desirable to have the possibility to delaminate a beverage container, i.e. in order to create a separate outer protective casing and an inner beverage bottle. A delaminated beverage container may be especially useful when handling a large amount of beverage together with a beverage dispensing system such as e.g. a water dispensing system or a draught beer dispensing system.

Conventional beverage dispensing systems operate with rigid containers made of e.g. glass, plastics or metal, filled with a beverage such as water, beer or the like. When dispensing the beverage a gas may be injected into the container to replace the drained beverage for pressure equalization and to aid dispensing. The gas may be injected with a high pressure, thereby acting to push out the beverage. Such principle is typical for a conventional beer dispensing system. The drawback of such system is the need for heavy steel containers, so called kegs, to withstand the high pressure. The gas may also be drawn into the beverage container by the under-pressure originating from the drainage of the beverage. Such principle is typical for a conventional water dispensing system. A common problem of the above principles is the need to inject gas into the beverage container from an external gas source, the gas source being either the ambient air or a high-pressurized gas bottle. This gas may affect and possibly degrade the beverage.

Novel dispensing systems, such as a DraughtMaster™ System produced by the applicant company are described in WO2007/019848, WO2007/019849, WO2007/019850, WO2007/019851 and WO2007/019853, avoid the above problem by working with a collapsible beverage container. The beverage container is made of a relatively thin thermoplastic material and is collapsed during dispensing by high-pressurized air. The beverage is thereby dispensed without any contact with the air. In this way no low pressure is generated and therefore there is no need for injecting gas into the beverage container.

The drawback of the above system is the need for relatively thin beverage containers, as they need to be collapsible. There is an apparent risk that such thin containers may burst, either during transportation of the beverage container or during dispensing as the beverage container is collapsed. A rupture of the beverage container will possibly lead to beverage leaking from the container and damaging external equipment and apparatus.

SUMMARY

It would clearly be beneficial to be able to combine the advantages of a rigid container with the advantages of a collapsible container. The solution to this is a multiple layer keg comprising an inner collapsible layer and an outer rigid layer.

Preferably, the outer layer is made sufficiently rigid to be able to offer some protection of the inner layer and not to be easily deformed or pierced. The outer layer may comprise non-delaminating sub layers or barrier layers such as a dye or a UV (ultraviolet) barrier for prolonging the shelf life of the beverage contained in the beverage container.

Preferably, the inner layer is made flexible in order to be collapsible during dispensing of the beverage. The inner layer may comprise non-delaminating sub layers or barrier layers such as a $CO_2$ and $O_2$ barrier for prolonging the shelf life of the beverage contained in the beverage container.

To be able to collapse the inner layer while keeping the shape of the outer layer a means of pressure equalization must be provided through the outer layer. This may in its simplest realization be in the form of a thin bore or pipe in the outer layer permitting the surrounding fluid, typically air, to enter the gap between the outer layer and the inner layer. More complex solutions may involve the use of a one-way valve to allow fluid to enter the gap between the outer layer and the inner layer but not to exit. Even more complex solutions may involve a chemical compound placed in the gap between the outer layer and the inner layer, which when activated generates a gas and thereby pressurizes the gap.

To minimize the material waste and to maximize the aesthetic appearance of the beverage container the gap between the beverage container layers should be kept as thin as possible in the full beverage container. Additionally, for the above purpose of having a rigid outer layer and a collapsible inner layer the gap should be uniform over the whole interface surface. This requires a controlled delamination process. Failing to delaminate a part of the interface may lead to a rupture of the inner layer when the inner layer collapses during dispensing.

An object of the present invention is to provide a method to provide a delaminated beverage container by separating the layers in a beverage container in a controlled process avoiding non-uniformly delaminated layers or partly delaminated layers.

The above object together with numerous other objects, advantages and features which will be evident from the below detailed description of the present invention is in accordance with a first aspect of the present invention obtained by a method of stretch-blow-moulding a beverage container for containing a carbonized beverage, the method comprising
  providing a preform having a neck part and a body part, the preform including
    an inner layer of a first polymeric composition,
    an outer layer of a second polymeric composition, and
    an intermediate layer of a third polymeric composition, the third polymeric composition having adhesive surface properties relative to the first and second polymeric compositions, the adhesive surface properties being permanently degraded by exposure to irradiation of a certain wavelength or certain wavelengths and intensity,
    mounting the preform onto a stretch-blow-moulding device and blow-moulding the preform into the beverage container by irradiating the body part with radiation at least including the certain wavelength or certain wavelengths and intensity while protecting the neck part from any substantial radiation.

In this context it has surprisingly been found out that a controlled delamination may be achieved in a conventional multilayer beverage container with at least two thermoplastic layers and in-between a third layer made of adhesive material forming an adhesive film. The delamination is initiated by removing the adhesive features of the adhesive film by overheating the adhesive film. The overheating will cause the adhesive properties of the adhesive film to be deteriorated or degraded. Such degradation may include the adhesive film being either transformed into a non-adhesive film or deteriorated such as e.g. dissolved, decomposed, vaporized or crystallized depending on the material used. Without the adhesive film a non-adhesive surface is created between the thermoplastic layers, and thus the adhesion between them will not be sufficient to prevent delamination. The thermoplastic layers will therefore separate forming a very thin gap where the previously adhesive film was or is located.

The adhesive film may comprise a material having adhesive surface properties being irreversibly deteriorated when heated sufficiently. The material chosen may decompose primarily into non-toxic substances such as $CO_2$ and water for environmental reasons and to avoid contaminating the beverage.

Alternatively, the adhesive film may be of a material, which merely permanently changes its surface parameters from being adhesive to become non-adhesive upon exposure to a high level of radiation without any deterioration of the material itself.

The adhesive film should be permanently degraded, i.e. the adhesive effect should not return upon removing the radiation source or cooling down the beverage container. The adhesive effect should also not return upon aging or when exposed to normal temperature variations or other similar environment changes to which the beverage container may be exposed to during transportation, storage and use.

The radiation sources should only expose the preform body to radiation. The neck of the preform and beverage container should preferably be well protected from any radiation source and remain laminated to seal and fixate the inner layer onto the outer layer.

The radiation sources used for degrading the adhesive properties of the intermediate layer may be the same and/or emitting the same wavelengths as used for softening the preform in the blow-moulding process. Alternatively the radiation sources used for degrading the adhesive properties of the intermediate layer may be another separate radiation source and/or emitting a separate wavelength or wavelengths. Further, the radiation used for degrading the adhesive properties may be of the same intensity as the radiation used for softening the preform, or alternatively different radiation intensity is used for softening the preform.

The blow-moulding process and the degrading process of the adhesive properties of the intermediate layer may be performed in a single production step or alternatively in two separate and subsequent production steps.

The advantages of the present method are the creation of a double walled container having a very thin delamination, thereby still ensuring that the delamination is present over the whole beverage container; the ability to control the delamination; and the ability to preserve the lamination at certain locations, e.g., around the mouth and neck of the beverage container.

An additional advantage of the method is that by means of the method it is possible to utilize a conventional moulding device used for moulding laminated beverage containers also for creating delaminated beverage containers simply by increasing the intensity of the IR lamp provided for heating the adhesive film.

The method may also be used without an intermediate layer comprising an adhesive film if the adhesive properties are provided by one of the other layers or a combination of the other layers.

According to a second aspect of the present invention, the invention further comprises a method of stretch-blow-moulding a beverage container for containing a carbonized beverage, the method comprising     providing a preform having a neck part and a body part, the preform including         an inner layer of a first polymeric composition,         an outer layer of a second polymeric composition, and         the first and second polymeric compositions exhibit adhesive surface properties relative to one another, the adhesive surface properties being permanently degraded by exposure to irradiation of a certain wavelength or certain wavelengths and intensity,     mounting the preform onto a stretch-blow-moulding device and blow-moulding the preform into the beverage container by irradiating the body part with radiation at least including the certain wavelength or certain wavelengths and intensity and while protecting the neck part from any substantial radiation.

By just using two layers, each comprising a specific material or treated in such a way that the layers are adhesive after injection, delamination may still be achieved during blow-moulding. The layers may comprise a material with adhesive surface properties, the material being deformable when exposed to a certain intensity of radiation. By exposing the material to a higher level of radiation the adhesive properties of the material may be degraded.

Another objective of the present invention is to provide a method for dispensing a beverage from a beverage container produced according to the method described above.

According to a third aspect of the present invention, the invention further comprises a method of dispensing a beverage from a beverage container by means of a dispensing device, the beverage container wall comprising two layers separated by an intermediate layer and produced in accordance with the methods described above, the dispensing device including:

a pressurizing device communicating with the intermediate layer of the beverage container, and     a tapping device including a tapping valve, the tapping device communicating with the beverage container by a tapping line extending from the beverage container to the tapping device.

The dispensing device preferably encompasses an inner chamber for holding the beverage keg, a tapping line for dispensing the beverage, an electrical pressurizing device for generating the driving pressure for dispensing the beverage and a cooling device to keep the beverage cool. A simple variant of the dispensing device may merely include a tapping line mounted directly onto the beverage container without any housing or cooling device. Such simple dispensing devices preferably use a chemical compound to generate the driving pressure needed to dispense the beverage through the tapping line.

The dispensing device according to the method has the advantage of not needing to pressurize the whole inner chamber, but only the small laminated gap. Thus, the pressure losses will thereby be significantly lower compared to pressurizing the whole inner chamber. Further, it is not necessary to seal the inner chamber pressure tight, thereby making simple dispensing devices according to the above possible.

The outer layer of the beverage container should not collapse and will thus keep its shape. The beverage container will thus be easy to mount and dismount from the dispensing system. The outer layer may preferably be collapsed manually after removal, and the whole beverage container may preferably be disposed or recycled in a suitable and ecological way.

The outer rigid layer will further serve to retain the beverage and prevent damage in case the inner collapsible layer bursts during dispensing or transporting. Measures should preferably be taken to prevent the leakage of the beverage from the outer layer through the bore or pipe or similar communication channels to the outside. Such measures may include the use of a simple one-way valve.

BRIEF DESCRIPTION OF THE DRAWINGS

The present invention is now to be further described with reference to the drawings, in which.

DETAILED DESCRIPTION

Below is a detailed description of the figures of a preferred embodiment of the present invention.

Figure 1A:
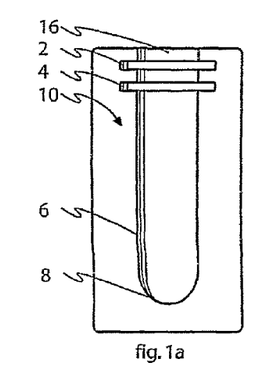
FIG. 1a is a vertical sectional view of an empty preform mould.

FIG. 1a is a vertical sectional view of an empty preform mould 10. The preform mould comprises an elongated cavity comprising a cylindrical wall 6, a closed bottom end 8 having a half-spherical shape, and an open top end which constitutes a mouth 16. The cylindrical wall 6 comprises an upper first flange groove 2 and a lower second flange groove 4 protruding perpendicular into the cylindrical wall 6 and encircling the mouth 16. The first flange groove 2 and the second flange groove 4 constitute two cylindrical and parallel hollow channels having a maximum radius approximately 4 mm wider than the cylindrical wall 6. The first flange groove 2 and the second flange groove 4 are spaced apart approximately 5 mm. The first flange groove 2 is situated approximately 5 mm below the mouth 16.

Figure 1B:
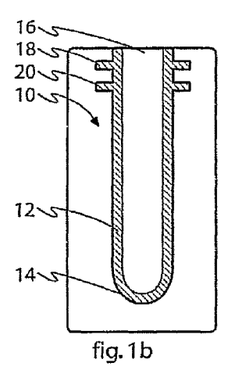
FIG. 1b is a vertical sectional view of the preform mould after injection of a PET layer.

FIG. 1b is a vertical sectional view of the preform mould 10 after injection of a PET (polyethylene terephthalate) layer 12. The designated numerals used in FIG. 1a refer to the same part in FIG. 1b. The PET layer 12 has a thickness of about 5 mm. The PET layer 12 comprises a bottom end 14 which is shaped according to the bottom end 8 of the mould, a first flange 18 which is shaped according to the first flange groove 2 and a second flange 20 which is shaped according to the second flange groove 4.

Figure 1C:
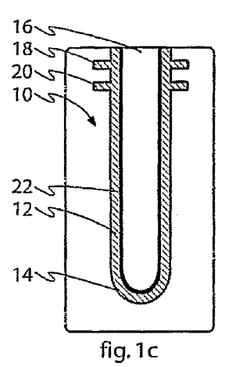
FIG. 1c is a vertical sectional view of the preform mould after injection of a nylon layer.

FIG. 1c is a vertical sectional view of the preform mould 10 after injection of a nylon layer 22. The designated numerals used in FIG. 1b refer to the same part in FIG. 1c. The PET layer 12 applied in FIG. 1b has in FIG. 1c been coated with a nylon layer 22. The nylon layer 22 is applied on the inwards facing surface of the PET layer 12. The thickness of the nylon layer 22 is significantly thinner than the PET layer, amounting to approximately 1-2 mm.

Figure 1D:
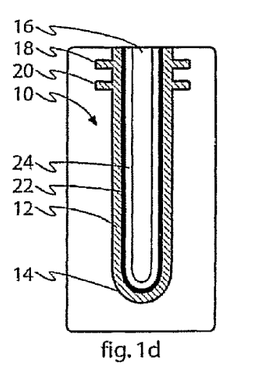
FIG. 1d is a vertical sectional view of the preform mould 10 after injection of a PP layer.

FIG. 1d is a vertical sectional view of the preform mould 10 after injection of a PP (polypropylene) layer 24. The designated numerals used in FIG. 1c refer to the same part in FIG. 1d. The nylon layer 22 applied in FIG. 1c has in FIG. 1d been additionally coated with a PP layer 24. The PP layer 24 is applied on the inwards facing surface of the nylon layer 22.

Figure 1E:
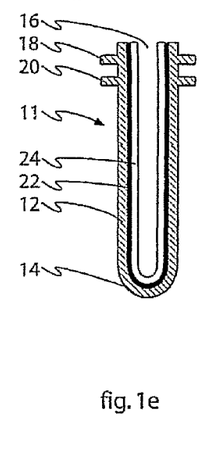
FIG. 1e is a vertical sectional view of the finished preform for use in a blow-moulding system.

FIG. 1e is a vertical sectional view of the finished preform 11 for use in a blow-moulding system. The designated numerals used in FIG. 1d refer to the same part in FIG. 1e. The preform 11 comprises three layers: an outer PET layer 12, an intermediate nylon layer 22 and an inner PP layer 24. The nylon layer 22 acts as an adhesive film fixating the PP layer 24 onto the PET layer 12.

Figure 1F:
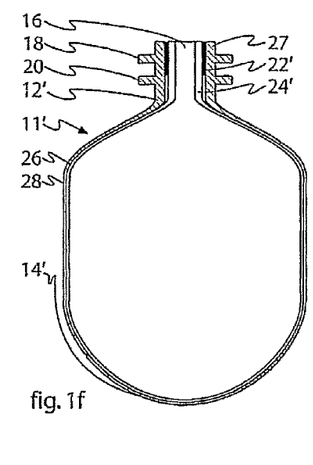
FIG. 1f is a vertical sectional view of a blow-moulded beverage keg.

FIG. 1f is a vertical sectional view of a blow-moulded beverage keg 11'. The designated numerals used in FIG. 1e refer to the same part in FIG. 1f. A different embodiment of the same part is designated by a prime (') symbol. The PET layer 12' and the PP layer 24' have been expanded compared to the preform 11, except near the mouth 16, the first flange 18 and the second flange 20 where the preform 11 shape is kept, thereby forming a neck part 27 and a body part 28. The nylon layer 22' has been dissolved by the heat from the blow moulding except on the neck 27 where the nylon layer 22' remains. The nylon layer 22' extends between the mouth 16 opening and the second flange 20. The dissolved part of the nylon layer 22 is replaced by a cavity 26. The remaining part of the nylon layer 22' effectively seals the cavity 26 between the PET layer 12' and the PP layer 24 at the mouth 16.

Figure 1G:
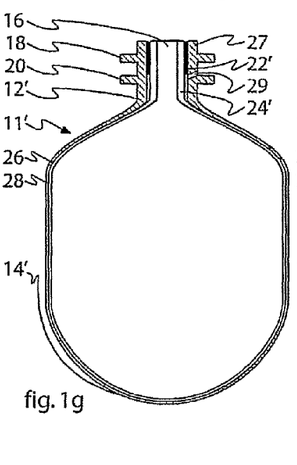
FIG. 1g is a vertical sectional view of the blow-moulded beverage keg.

FIG. 1g is a vertical sectional view of the blow-moulded beverage keg 11'. The designated numerals used in FIG. 1f refer to the same part in FIG. 1g. A thin pipe 29 has been provided for communication between the cavity 26 and the outside. The thin pipe 29 penetrates the keg wall 12' but does not penetrate the PP layer 24'. The thin pipe 29 is situated on the neck 27 between the first flange 18 and the second flange 20.

Figure 1H:
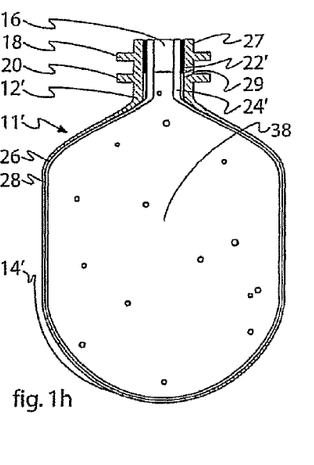
FIG. 1h is a vertical sectional view of the blow-moulded beverage keg filled with a carbonated beverage.

FIG. 1h is a vertical sectional view of the blow-moulded beverage keg 11' filled with a carbonated beverage 38 such as beer or soft drink. The designated numerals used in FIG. 1g refer to the same part in FIG. 1h.

Figure 2A:
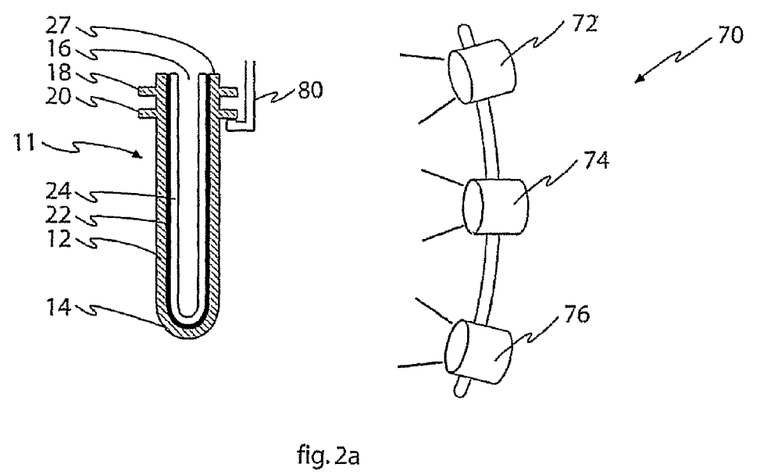
FIG. 2a is a vertical sectional view of a preform together with a set of IR lamps before the blow-moulding process.

FIG. 2a is a vertical sectional view of a preform 11 together with a set of IR (infrared) lamps 70 before the blow moulding process. The designated numerals used in FIG. 1h refer to the same part in FIG. 2a. The infrared lamps designated the numerals 72, 74 and 76, have been designed to radiate a specific wavelength or wavelengths selected to be absorbable by the body part of the preform 11. In the described embodiment IR lamp 72 radiates a frequency specially chosen to heat and soften the PET layer 12, IR lamp 74 radiates a frequency specially chosen to heat and soften the PP layer 24 and IR lamp 76 radiates a frequency specially chosen to heat and soften the nylon layer 22. A holder 80 fixates the preform 11 during the heating and moulding process and protects the neck part 27 of the preform 11 comprising the mouth 16, the first flange 18 and the second flange 20 from the heat and radiation applied by the set of IR lamps 70.

Figure 2B:
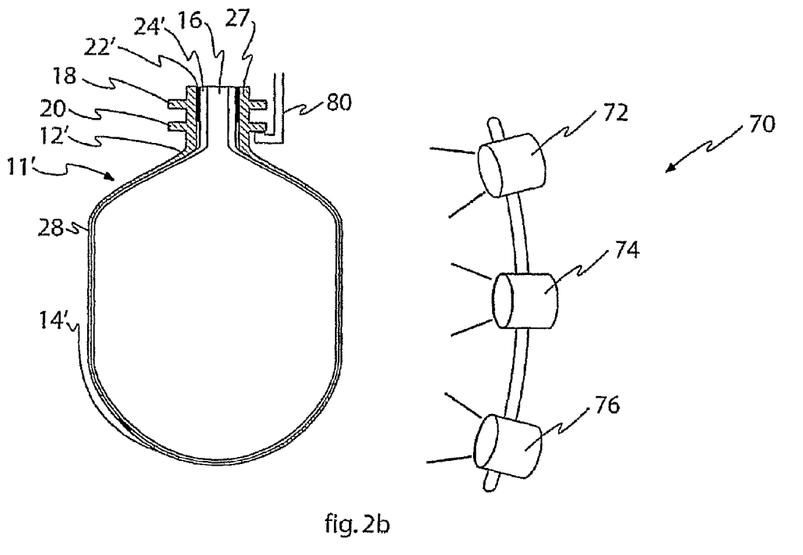
FIG. 2b is a vertical sectional view of a beverage keg together with a set of IR lamps after the blow-moulding process.

FIG. 2b is a vertical sectional view of a beverage keg 11' together with a set of IR (infrared) lamps 70 after the blow moulding process. The designated numerals used in FIG. 2a refer to the same part in FIG. 2b. The IR lamp 74 is adapted to overheat and degrade the nylon layer 22, thereby delaminating the walls of the finished beverage keg 11'.

Figure 3A:
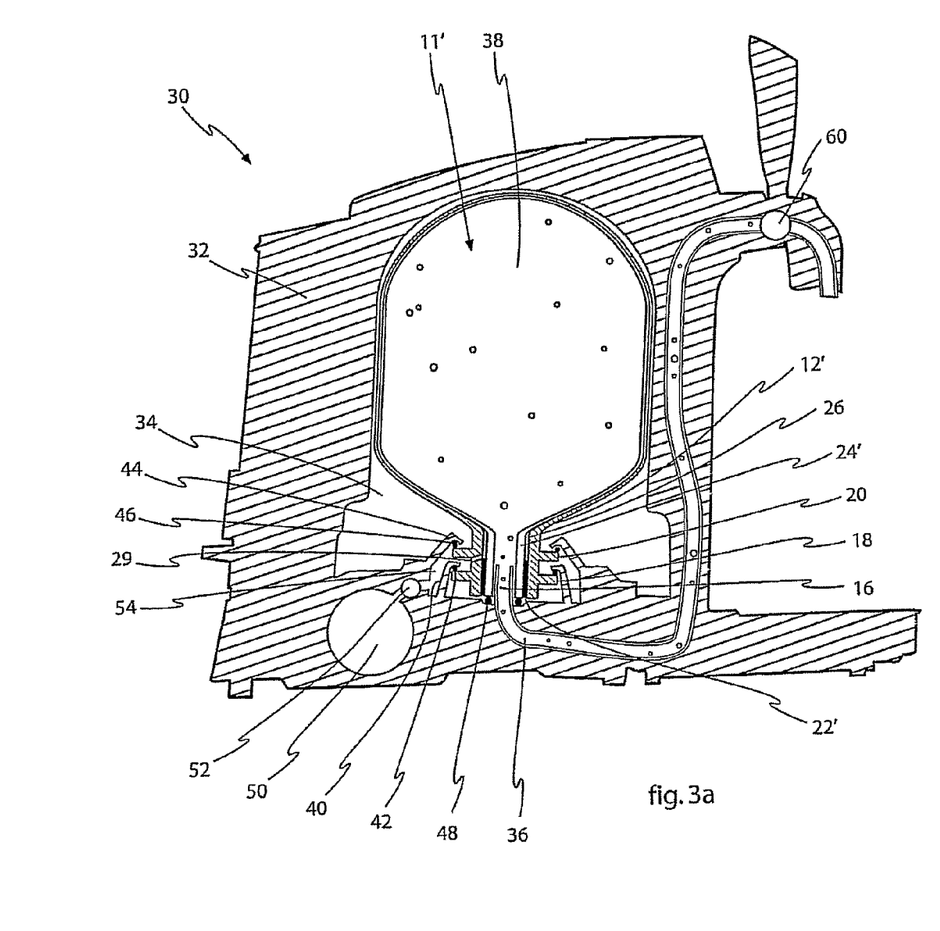
FIG. 3a is a vertical sectional view of a beverage dispensing system.

FIG. 3a is a vertical sectional view of a beverage dispensing system 30. The designated numerals used in FIG. 1h refer to the same part in FIG. 3a. The beverage dispensing system comprises a housing 32 and an inner chamber 34. The inner chamber 34 contains the beverage keg 11'. The beverage keg 11' is fixated to the housing 32 by a lower first clamp 40 and an upper second clamp 44. The first clamp 40 fixates the first flange 18 and the second clamp 44 fixates the second flange 20. The mouth 16 is thereby juxtaposed a tapping line 36 and sealed to the tapping line 36 by a seal 48. The first clamp 40 and the second clamp 44 apply a force onto the first flange 18 and the second flange 20 in the direction of the tapping line 36 and seal 48, thereby fixating the beverage keg 11' onto the housing 32 in a stable and secure way. A seal 42 seals the first clamp 40 to the first flange and a seal 46 seals the second clamp 44 to the second flange. The tapping line 36 transports the beverage 38 from inside of the beverage keg 11' to a tapping valve 60. The tapping valve 60 controls the flow of beverage 38 to the outside of the housing 32. The housing 32 further comprise a pressurizing device 50. The pressurizing device 50 communicates to a channel 54 located between the first clamp 40 and the second clamp 44 via a controlling valve 52. The pressure is further communicated into the cavity 26 by means of the thin pipe 29.

Figure 3B:
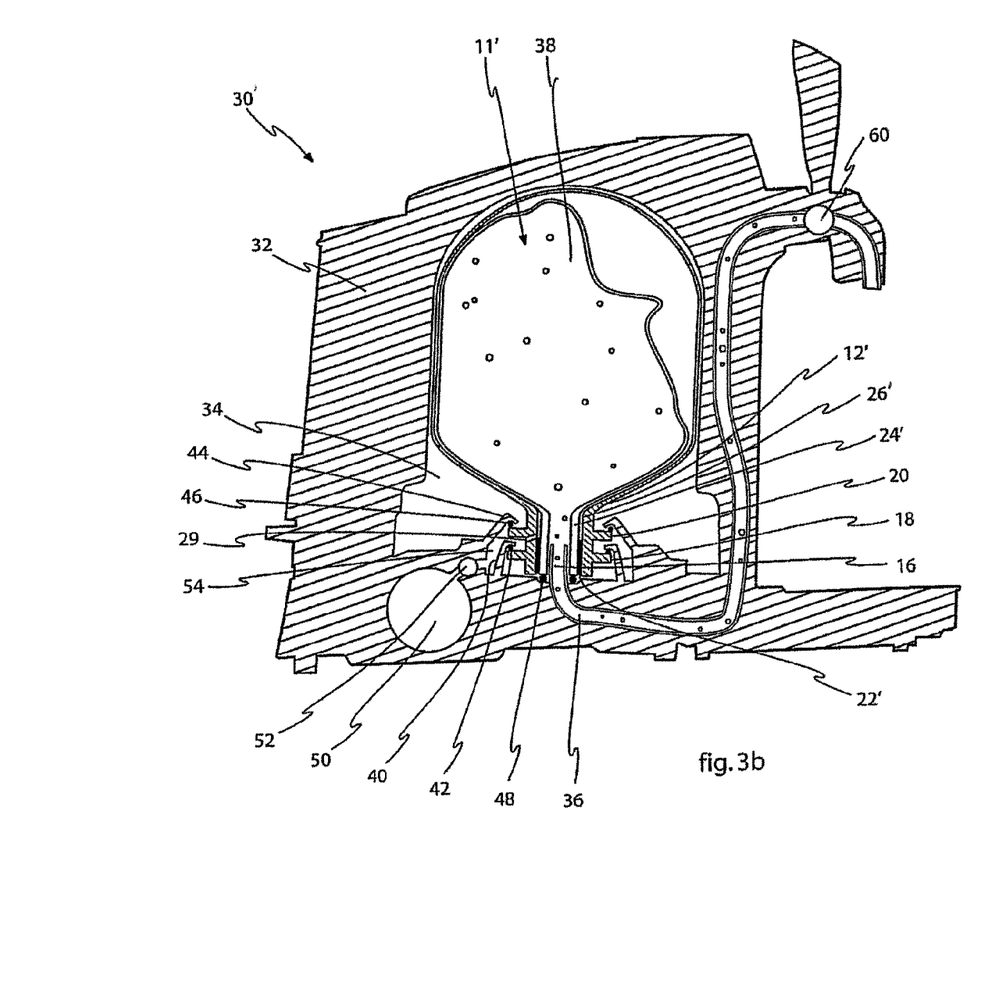
FIG. 3b is a vertical sectional view of a second embodiment of a beverage dispensing system.

FIG. 3b is a vertical sectional view of a second embodiment of a beverage dispensing system 30'. The designated numerals used in FIG. 3a refer to the same part in FIG. 3b. A different embodiment of the same part is designated by a prime ('). FIG. 3b is a beverage dispensing system 30', which is partly drained of beverage 38. The PP layer 24' is strictly following the beverage 38 surface and has been strongly deformed due to the outflow of the beverage 38 from the beverage keg 11' and inflow of air into the cavity 26'. The beverage keg 11' keeps its shape and upright position during the dispensing. The cavity 26' increases in volume due to the inflow of air through the thin pipe 29 as the beverage 38 decreases in volume. The pressure in the cavity 26' should be higher than the ambient pressure outside the beverage dispensing system 30 thereby pushing the beverage through the tapping line 36 when the tapping valve 60 is shifted to open position. The pressure inside the cavity 26' is also higher than the pressure in the inner chamber 34, thereby ensuring that the PET layer 12 keeps its original shape. The PP layer 24' being a flexible material will collapse as the beverage volume is reduced until the beverage 38 is completely drained and thereby also the PP layer 24' is completely collapsed.

Figure 4:
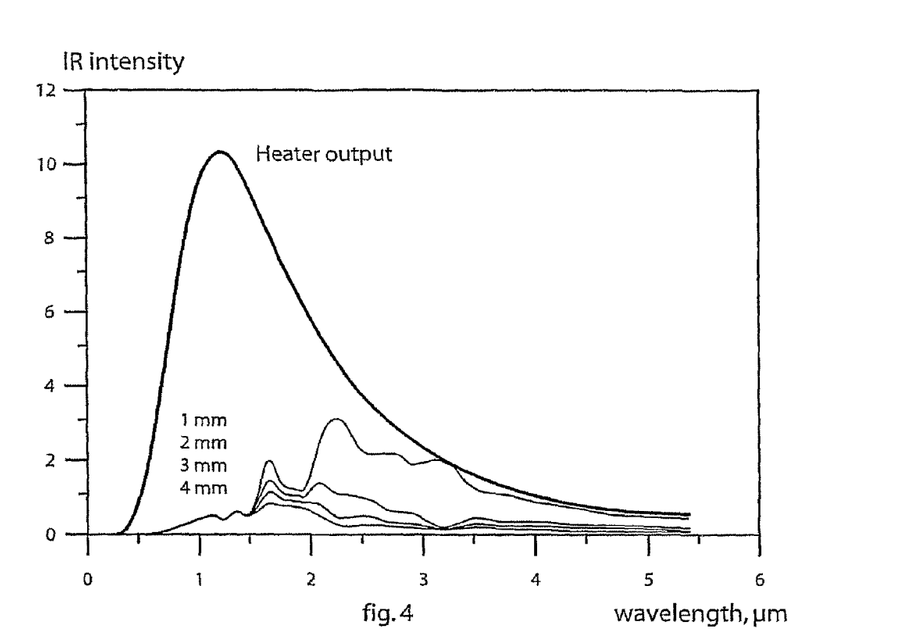
FIG. 4 is a graph where the wavelength is indicated along the abscissa axis and the IR intensity is indicated along the ordinate axis.

FIG. 4 is a graph where the wavelength is indicated along the abscissa axis and the IR intensity is indicated along the ordinate axis. A first curve designated "heater output" represents the energy emitted from an IR irradiation source or heater irradiating at wavelengths from below 0.5 µm to above 5 µm. The irradiation from the IR source or heater is irradiated to a PET container having a wall thickness of more than 4 mm and four distinct curves below the heater output curve indicate the energy absorption at a depth of 1 mm, at a depth of 2 mm, at a depth of 3 mm and finally at a depth of 4 mm within the PET body originating from the IR energy or irradiated from the heater.

Figure 5:
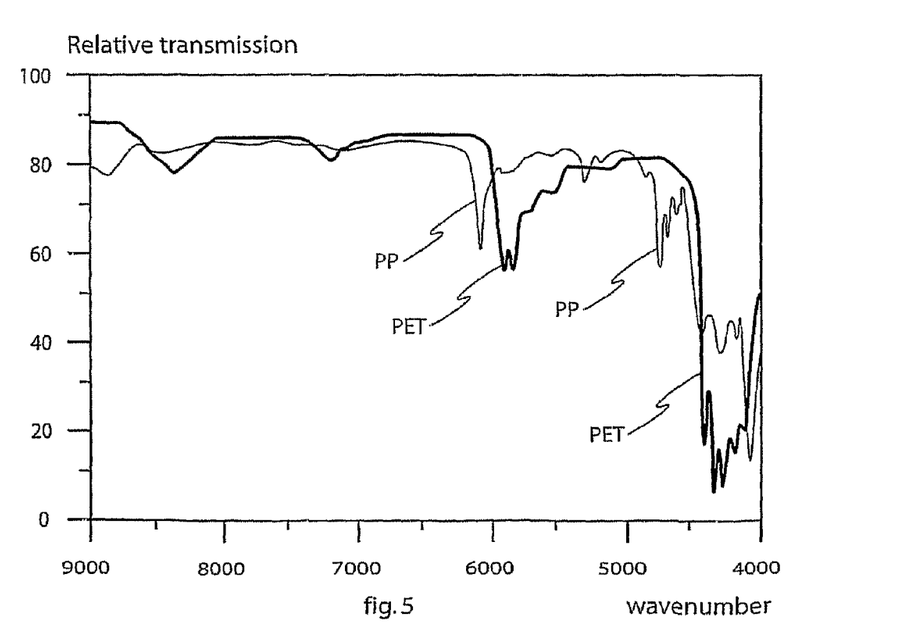
FIG. 5 is a graph where the wave number is indicated along the abscissa axis and the absorption/transmission is indicated along the ordinate axis.

FIG. 5 is a graph where the wave number (number of wavelength per 1 cm) is indicated along the abscissa axis and the absorption/transmission is indicated along the ordinate axis. The thin line indicates the transmission/absorption of PP within the wave number range 3000-9000 and similarly, the heavier line curve designated PET indicates the transmission and absorption of PET within the same wave number interval.

Figure 6:
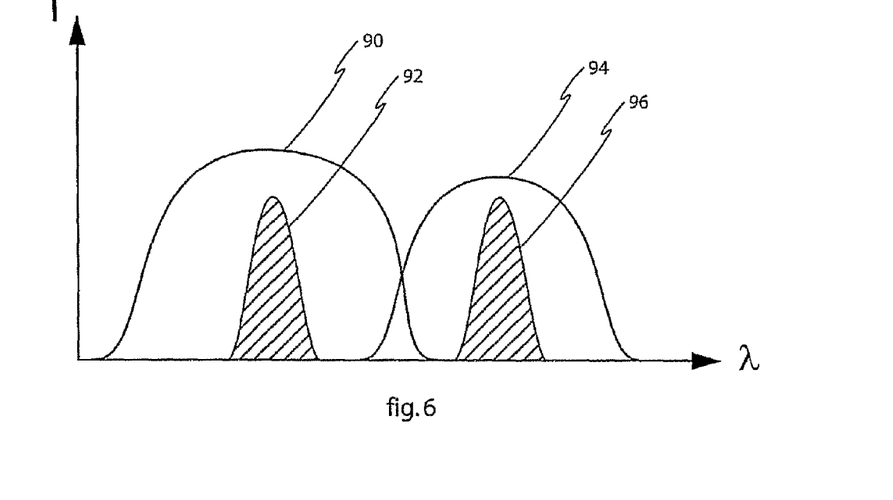
FIG. 6 is the absorption spectrum of the two layers of the preform.

FIG. 6 is the absorption spectrum of one of the two layers of the preform 11 designated the reference numeral 90 and the absorption spectrum of the other layer of the preform 11 designated the reference numeral 94. The absorption spectra 90 and 94 are distinct. Consequently, by irradiating electromagnetic radiation of the wavelength interval illustrated by a peak 92 to the one layer of the preform 11 and at the same time or in a separate step irradiating electromagnetic radiation of the wavelength interval illustrated by a peak 96 to the other layer, the two layers may be separately heated and softened.

Figure 7:
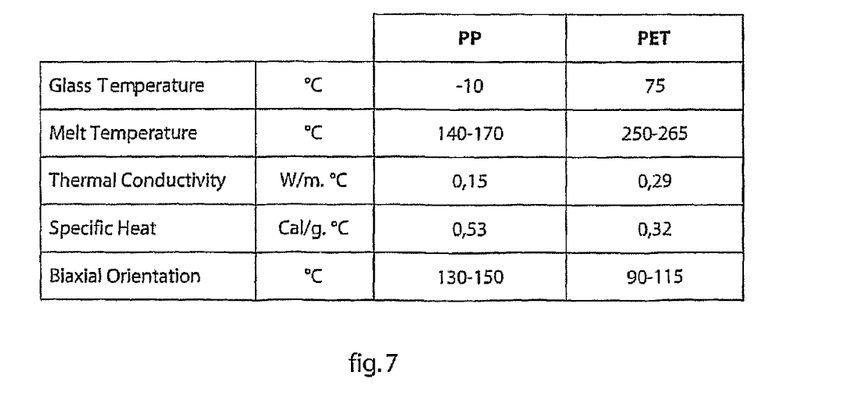
FIG. 7 is a table of some basic material properties of PP and PET.

FIG. 7 is a table illustrating the differences between PP and PET in terms of glass temperature, melt temperature, thermal conductivity, specific heat and biaxial orientation.

LIST OF PARTS

2 First flange cavity
4 Second flange cavity
6 Mould wall
8 Mould bottom end
10 Preform mould
11 Preform
11' Beverage keg
12 Preform wall
12' Keg wall
14 Preform bottom end
14' Keg bottom end
16 Mouth
18 First flange
20 Second flange
22 Nylon layer (Preform)
22' Nylon layer (Keg)
24 PP layer (Preform)
24' PP layer (Keg)
26 Cavity (Gap)
26' Cavity (Deformed)
27 Neck
28 Body
29 Thin pipe
30 Beverage dispensing system (First embodiment)
30' Beverage dispensing system (Second embodiment)
32 Housing
34 Chamber
36 Tapping line
38 Beverage
40 First clamp
42 Seal
44 Second clamp
46 Seal
48 Seal
50 Pressurizing device
52 Valve
54 Channel
60 Tapping valve
70 Set of IR lamps
72 IR lamp
74 IR lamp
76 IR lamp
80 Holder

The invention claimed is:

1. A method of stretch-blow-moulding a beverage container for containing a carbonated beverage, the method comprising:
   (a) providing a preform having a neck part and a body part, the preform including an inner layer of a first polymeric composition, an outer layer of a second polymeric composition, and an intermediate layer of a third polymeric composition, the third polymeric composition having adhesive surface properties relative to the first and second polymeric compositions, the adhesive surface properties being permanently degradable by exposure to radiation of a certain wavelength; and
   (b) mounting the preform into a stretch-blow-moulding device and blow moulding the preform to form the beverage container by irradiating the body part with radiation including at least the certain wavelength which permanently degrades the adhesive surface properties of the third polymeric composition while shielding the neck part from the radiation.

2. The method of claim 1, wherein the first polymeric composition has a first absorption spectrum that includes the certain wavelength, and wherein irradiating the body part includes irradiating with radiation in the first absorption spectrum and with radiation having the certain wavelength.

3. The method of claim 1, wherein the first polymeric composition has a first absorption spectrum that does not include the certain wavelength, and wherein irradiating the body part includes irradiating with radiation in the first absorption spectrum and with radiation having the certain wavelength.

4. The method of claim 1, wherein the second polymeric composition has a second absorption spectrum that includes the certain wavelength, and wherein irradiating the body part includes irradiating with radiation in the second absorption spectrum and with radiation having the certain wavelength.

5. The method of claim 1, wherein the second polymeric composition has a second absorption spectrum that does not include the certain wavelength, and wherein irradiating the body part includes irradiating with radiation in the second absorption spectrum and with radiation having the certain wavelength.

6. The method of claim 2, wherein the radiation having the certain wavelength and the radiation in first absorption spectrum are emitted with different radiation intensities.

7. The method of claim 4, wherein the radiation having the certain wavelength and the radiation in the second absorption spectrum are emitted with different radiation intensities.

8. The method of claim 1, wherein the preform is selected from the group consisting of an injection-moulded preform and a pressure-moulded preform.

9. A method of stretch-blow-moulding a beverage container for containing a carbonated beverage, said method comprising
   (a) providing a preform having a neck part and a body part, the preform including an inner layer of a first polymeric composition and an outer layer of a second polymeric composition, wherein the first and second polymeric compositions exhibit adhesive surface properties relative to one another, the adhesive surface properties being permanently degradable by exposure to radiation of a certain wavelength; and (b) mounting the preform into a stretch-blow-moulding device and blow-moulding the preform to form the beverage container by irradiating the body part with radiation including at least the certain wavelength which permanently degrades the adhesive surface properties while shielding the neck part from the radiation.

10. The method of claim 9, wherein the first polymeric composition has a first absorption spectrum that includes the certain wavelength, and wherein irradiating the body part includes irradiating with radiation in the first absorption spectrum and with radiation having the certain wavelength.

11. The method of claim 9, wherein the first polymeric composition has a first absorption spectrum that does not include the certain wavelength, and wherein irradiating the body part includes irradiating with radiation in the first absorption spectrum and with radiation having the certain wavelength.

12. The method of claim 9, wherein the second polymeric composition has a second absorption spectrum that includes the certain wavelength, and wherein irradiating the body part includes irradiating with radiation in the second absorption spectrum and with radiation having the certain wavelength.

13. The method of claim 9, wherein the second polymeric composition has a second absorption spectrum that does not include the certain wavelength, and wherein irradiating the body part includes irradiating with radiation in the second absorption spectrum and with radiation having the certain wavelength.

14. The method of claim 10, wherein the radiation having the certain wavelength and the radiation in the first absorption spectrum are emitted with different radiation intensities.

15. The method of claim 12, wherein the radiation having the certain wavelength and the radiation in the second absorption spectrum are emitted with different radiation intensities.

16. The method of claim 9, wherein the preform is selected from the group consisting of an injection-moulded perform and a pressure-moulded perform.

\* \* \* \* \*